United States Patent [19]

Stanford et al.

[11] 3,959,158

[45] May 25, 1976

[54] HIGH TEMPERATURE CORROSION INHIBITOR FOR GAS AND OIL WELLS

[75] Inventors: James R. Stanford, Sugar Land; George D. Chappell, Rosenberg, both of Tex.

[73] Assignee: Nalco Chemical Company, Oak Brook, Ill.

[22] Filed: Sept. 3, 1974

[21] Appl. No.: 502,462

[52] U.S. Cl. .......................... 252/8.55 E; 21/2.5 R; 21/2.7 R; 252/391
[51] Int. Cl.² .................... C23F 11/16; C23F 11/04
[58] Field of Search ............... 252/8.55 E, 391, 392; 21/2.5, 2.7

[56] References Cited
UNITED STATES PATENTS

| | | | |
|---|---|---|---|
| 2,839,465 | 6/1958 | Jones | 252/8.55 |
| 3,003,955 | 10/1961 | Jones | 252/8.55 |
| 3,412,024 | 11/1968 | Stanford | 252/8.55 |
| 3,712,862 | 1/1973 | Bundrant et al. | 252/8.55 |

OTHER PUBLICATIONS
Encyclopedia of Chemical Technology, Second Edition, Vol. 8, 1965, pp. 847 and 848.

*Primary Examiner*—Herbert B. Guynn
*Attorney, Agent, or Firm*—John G. Premo; John S. Roberts

[57] ABSTRACT

Compositions and methods for the protection of steel and metal well equipment used in high temperature oil and gas wells above 250°F and more particularly in the range of about 300°–550°F for bottom hole temperatures. The basic composition is a trimer acid salt of a primary mono-amine and particularly useful is a primary amine such as a primary tallow amine having $C_9$–$C_{24}$ carbon length. Other ingredients include a sulfonate, particularly an alkaryl sulfonate, as well as a mixture of dispersing agents or solvents specially utilizing a combination of a lower alkanol and a highly aromatic solvent as make up. Optionally there may be included a minor amount of a water-in-oil demulsifier. The reaction of the trimer acid with the mono-amine affords less opportunity for any further deleterious reaction or polymerization than as previous formulations utilizing polyamines with dimer acids and the like.

9 Claims, No Drawings

HIGH TEMPERATURE CORROSION INHIBITOR FOR GAS AND OIL WELLS

In the production of oil, the corrosion of steel and other metal well equipment is caused by the action of certain types of sulfur bearing waters, dissolved carbon dioxide and natural brines. Various methods have been employed to prevent corrosion of such equipment. It is common practice to introduce an inhibitor at the well head into the annular space between the casing and the tubing in a well extending into a producing formation. Liquid inhibitors which have been used are expected to flow to a producing zone in the well to mix with the corrosive liquids flowing therefrom and then flow up through the tubing to the surface.

In prior history the temperature in the well where the inhibitor was utilized has been in a range up to about 250°F. Recently, however, due to the exhaustion of primary wells and other factors of natural location, a substantial number of wells have an operating temperature well above 250°F and in the range 300°–550°F. These higher temperatures have caused break down of corrosion inhibition where previously satisfactory formulations have been used. Therefore, the present compositions and methods are designed to be effective in "high temperature" operation of gas and oil wells. Such compositions should be free of potential of polymerization found in previous formulations and to effectively inhibit corrosion at operating temperatures up to 550°F.

The present formulations and compositions are basically trimer acid salts of primary amines. Also included are an alkaryl sulfonate and a combination of dispersants or solvents which include a mixture of a lower alkanol and a highly aromatic solvent such as a BTX-type solvent (benzene, toluene, xylene). A minor amount of a conventional antifoam or a water-in-oil emulsifier may be added to the composition. The present compositions are also very effective in sweet oil systems which lack mercaptans. Sour wells are usually designated as those containing mercaptan or hydrogen sulfide.

PRIOR ART

U.S. Pat. No. 3,412,024 Stanford (Nalco)
A corrosion inhibiting composition which includes polyalkylene polyamine, an alkylbenzene sulfonic acid, and may further include dimer and trimer fatty acids. In this patent the chemicals are described as alkylbenzene sulfonic acid salts of partial amides of organic polyamines and carboxylic acids. In this case at least one and up to all of the basic, nonamidified amino groups form amine salt groups with the alkylbenzene sulfonic acid.

In the present invention utilizing primary mono-amines, the primary amines preferentially form amine salts and the formation of amide is discouraged. Further, the theoretical and actual prediction is for less polymerization of the present formulations under the higher temperatures utilized and less plugging and solubility problems.

U.S. Pat. No. 2,290,154 Blair (Petrolite)
Early patent teaching the usefulness of the basic polyamino amides in breaking emulsions.
U.S. Pat. No. 2,763,612 Raifsnider et al (Shell Dev. Co.)
Teaches at column 8 a treatment of sour wells for pitting corrosion and metal fatigue utilizing amine salts generally and dimer acids
U.S. Pat. No. 2,839,465 Jones (Pan Am. Petroleum)
Columns 3–4 teach the utilization of lower molecular weight alcohols such as methanol, ethanol, and isobutanol as satisfactory mutual solvents for oil in water in this setting.
U.S. Pat. No. 2,877,185 Krumrei et al (P and G)
As solubilizers are taught sodium toluene sulfonate, sodium benzene sulfonate, and sodium xylene sulfonate.

THE COMPOSITIONS

The compositions of the present invention are set out below in broad and intermediate ranges:

|  | Broad | Intermediate | Preferred |
|---|---|---|---|
| Primary mono-amine where the carbon chain is $C_9$–$C_{24}$ | 5–50 | 5–30 | 10–20 |
| Trimer acid | 5–50 | 5–30 | 10–20 |
| Alkaryl sulfonic acid | 1–20 | 1–20 | 1–20 |
| Lower alkanol dispersant and aromatic solvent | make-up | make-up | make-up |

The best mode showing a narrow working example is set out as Example 1 following.

THE COMPONENTS

Necessary Ingredients

A preferred primary mono-amine utilizable in the present invention is tallow amine. Other primary amines preferred are higher aliphatic amines having $C_9$–$C_{24}$ carbon length such as dodecylamine, tetradecylamine, and octadecylamine. Other operable primary amines include hydrogenated tallow amine, cottonseed amine, cocoamine, etc. The list of primary amines in Table 6 denoting commecially available fatty amines set out in the *Encyclopedia of Chemical Technology* II, Vol. 2, page 134, incorporated herewith by reference, is illustrative of operable amines (excluding octylamine, $C_8$).

Trimer Acid. Trimer acids are well known and are commercially available under various tradenames as, for example, Empol 1040 Trimer Acid, which is 90% trimer and 10% dimer (Emery). Other utilizable trimer acids include Emergy Acid 1040, Versatryne 213 (General Mills), and Hercules Pamolyn 4226. For the present specification and claims the term "trimer acid" will be utilized to designate a polymerized carboxylic acid which is at least 80% trimer. The chemical technology of trimer acids is covered in the *Encyclopedia of Chemical Technology* II, Vol. 8, pages 847–848, which notes that usually this type of acid is produced by isomerization of a polyunsaturated acid such as linoleic which then polymerizes through the dimer to a trimer acid with free carboxyl groups. This product may be viewed as a polymeric acid which is essentially a trimer but contains traces of dimer acids and monoacids and where each repeating unit contains between 12 and 24 carbon atoms. It is substantially a saturated acid but may contain minor amounts of unsaturants and an example of a preferred starting material is a $C_{18}$ unsaturated acid occurring in tall oil. The trimer Empol 1040 is taught and described at columns 3–4 for treating used lubricating oils in U.S. Pat. No. 3,450,627 Johnson (Nalco). These Empol trimer polymers are further described in trade literature by Emery Industries, Cincinnati, Ohio, entitled "Empol Dimer and Trimer Acids," 1970, pages 3–6, together with chemical and physical parameters and this specific information is herewith incorporated by reference.

Benzene Sulfonic Acid. The alkaryl sulfonate utilized also functions as a salt forming vehicle with the trimer acid as well as providing detergent values in the composition. In general, alkyl benzene as well as alkyl naphthalene sulfonates may be utilized and in the benzene series, toluene and xylene are also operative. The chain length for the alkyl substituent to the aromatic ring is $C_5$–$C_{18}$. Specific examples include sodium toluene sulfonate, sodium benzene sulfonate, and sodium naphthalene sulfonate as well as the analogous potassium salts. In this specification and claims where, for example, the term "sodium benzene sulfonic acid" is utilized, the expression is meant to include also the alkali metal salts of the acid. Dodecylbenzene sulfonic acid is preferred.

Mercaptans and alpha olefin sulfonic acid are listed as non-preferred alternatives to the above alkaline sulfonates; e.g., a $C_{13}$ alpha olefin sulfonate.

Make-up Ingredients

The necessary solvents and dispersants for this invention are composed of a mixture of a lower alkanol and a highly aromatic solvent. The alcohol may be selected from straight or branched chain lower monohydric alcohols excepting methanol, or, alternatively, a $C_2$–$C_6$ alkanol. Such an alcohol is known in the art as a mutual solvent and is thus described in U.S. Pat. No. 2,839,465 Shock et al.

The aromatic solvent may be any suitable oil fraction having higher aromatic values. Specially preferred solvents are the so-called BTX (benzene, toluene, xylene) type. In general, the more favorable ratio between the aromatic solvent and the alkanol is from about 5:1 to 7:1, but an operable ratio of 10:1 to 1:10 is possible. Additionally, the combination of solvents is designated make-up since the inhibitor will function within a wide range of weight percent solvent and even dry. A specially preferred solvent is isobutanol due to the flash point properties of the end product. For reasons of solubility, however, methanol may not be used. A preferred so-called processing solvent is an $SO_2$ extract, which is a highly aromatic solvent.

Optional Ingredients

As an optional ingredient, a minor percentage of an emulsion breaker of the water-in-oil type may be utilized to facilitate phase separation. Such a preferred emulsion breaker is a blend of an ethoxylated nonyl phenol resin with a mixed ester of an oxyalkylated tripentaerythritol monoester.

Broadly, organic water-in-oil demulsifying agents which can be incorporated into the compositions of the invention are disclosed in numerous patents, including among others, U.S. Pat. Nos. 3,042,625, 3,098,827, 3,210,291, 3,206,412, 3,202,615, 3,166,516, and 3,278,637.

These demulsifying agents which are usually referred to as "emulsion breakers" are commonly employed for breaking water-in-oil emulsions. One type of water-in-oil demulsifying agent which is particularly useful in compositions of the present invention is a mixed ester of a polycarboxy acid containing 5–54 carbon atoms and (a) an oxyalkylated rosin acid containing 2–4 carbons atoms in the oxyalkyl groups and (b) an oxyethylated nonyl-phenol-formaldehyde resin.

EXAMPLE 1

Inhibiting Composition A - Working Example

|  | Wt. % |
|---|---|
| Processing Solvent | 53.85 |
| Isobutanol | 7.70 |
| Primary Tallow Amine | 15.38 |
| Emery 1040 Trimer Acid | 15.38 |
| Dodecylbenzenesulfonic Acid | 7.69 |
| Emulsion Breaker | 0.20 |
|  | 100.20 |

Procedure:

The first three materials were added, followed by the addition of the next three materials, in order, slowly as some heat will be evolved. The temperature was kept below 90°C to prevent boiling off the isobutanol. When all materials had been added, the mixture was stirred for 30 minutes.

The composition above had the following properties:

| Color | Amber |
|---|---|
| Odor | Aromatic |
| Spec. Gravity at 60°F | 0.908 |
| Density at 60°F | 7.57 lbs/gal |
| Flash point (TOC) | 131°F |
| Viscosity at 60°F | 141 cps |
| Pour point | −30°F |
| Solubility: |  |
| Kerosene | Insoluble at concentrations below 1 part chemical to 7 parts kerosene |
| Aromatic solvents | Soluble |
| Alcohol | Soluble |
| Water | Insoluble--not dispersible |

EXAMPLE 2

Samples prepared with the formulation of Example 1 were tested according to the following protocol:

This composition of the invention was evaluated by semi-dynamic corrosivity of produced fluids by determining weight loss of metal specimens exposed in sealed vessels containing the fluids. The sealed vessels were mounted on a wheel or mountingboard and maintained under constant rotation and temperature throughout the exposure period.

The effectiveness of inhibitors was rated by comparing weight losses of similar specimens in inhibited and uninhibited samples of fluid. The procedure was as follows:

Test cells were filled with fresh fluids at the same oil/water ratio as existed in the field samples. (If a sizeable vapor speace existed in the sample bottles as received, the fluids in the bottles were purged with inert gas to remove oxygen. The purged samples then were saturated with carbon dioxide, if they were from sweet gas condensate wells, or were saturated with hydrogen sulfide, if they were from sour wells.)

Inhibitors for evaluation were introduced into the test cells at various dosages. "Control" test cells containing no chemical also were used, to establish a base corrosion rate from which relative "percent protection" provided by the chemicals could be computed. All tests normally were run in duplicate.

Weighed metal specimens were inserted and the test cells mounted on a rotating "wheel". The sealed test vessels were maintained under constant temperature and rotation rate throughout the exposure.

Following exposure, the specimens were removed, degreased in acetone or benzene and then scrubbed with soap and water. If corrosion products adhered to the surface, they were removed by dipping the coupons in inhibited technical grade hydrochloric acid. After cleaning, the coupons were immersed in alcohol, then in acetone or benzene, dried and reweighed.

$$\frac{(\text{wt. loss uninhibited} - \text{wt. loss with inhibitor})}{\text{wt. loss uninhibited}} \times 100 = \text{percent protection}$$

General test conditions were as follows:
(1) Volume of test cell--200 ml (about 0.4 pint)
(2) Surface area of specimen per unit volume--11.41 sq. ft./bbl. (1 cm$^2$/15 ml) maximum
(3) Temperature range--room temperature to 200°F.
(4) Type specimen--mild steel plate or carbon steel rod
(5) Surface of specimen--sandblasted (plate) or polished (rod)
(6) Exposure period--24 hours
(7) Rotation rate--24 r.p.m.

Corrosion rates determined in this test typically were in excess of rates encountered in the field. This acceleration and magnification of corrosive attack showed up differences between chemicals and thus was an effective screening procedure.

Experience indicated that the following rough correlation existed between corrosivity ratings on this test and actual corrosivity of fluids in the field:

| Weight loss in this test | Typical corrosiveness in field |
|---|---|
| Less than 10 milligrams | Mild |
| 10–20 | Moderate |
| More than 20 | Severe |

The following rough correlations also appeared to exist between percent protection as furnished by inhibitors in this laboratory test and the performance of the inhibitors in the field:

| Protection by inhibitor in lab tests | Inhibitor performance in field |
|---|---|
| 90% or more | Excellent |
| 75 to 89% | Good |
| 50 to 74% | Fair |
| Less than 50% | Poor |

EXAMPLE 2A

Utilizing an inhibitor composition in accordance with Example 1, the following results were obtained:

| | Wheel Test |
|---|---|
| Fluid: | Kerosene and 5% NaCl Brine |
| Oil/Water Ratio: | 50/50 |
| Temperature: | 160°F |
| Acid Gas: | $CO_2$ |
| Time: | Adsorption — 1 hour |
| | Exposure — 23 hours |

Test run in duplicate

| Concentration, ppm | | Percent Inhibition | |
|---|---|---|---|
| Initial | Final | 1 | 2 |
| 5M | 0 | 97 | 99 |
| 10M | 0 | 99 | 99 |
| 20M | 0 | 98 | 99 |
| 50M | 0 | 99 | 98 |
| 25 | 25 | 74 | 37 |
| 50 | 50 | 99 | 99 |
| 100 | 100 | 98 | 99 |
| 200 | 200 | 99 | 99 |

Blank weight loss was 85.9 mg

EXAMPLE 2B

Following the procedure of Example 2A, these results were obtained:

| | Wheel Test |
|---|---|
| Fluid: | Kerosene and 5% NaCl Brine |
| Oil/Water Ratio: | 50/50 |
| Temperature: | 300°F |
| Acid Gas: | $CO_2$ |
| Time: | 24 hours |

Test run in duplicate

| Concentration ppm | Percent Inhibition | |
|---|---|---|
| | 1 | 2 |
| 50 | 99 | 85 |
| 100 | 91 | 99 |
| 150 | 95 | 95 |
| 200 | 99 | 97 |
| 300 | 95 | 99 |

Blank weight loss was 17.4 mg

Results: The results showed high inhibition percentiles for both Examples 2A and 2B.

EXAMPLE 3

High Temperature Persistent Chemical

Test No. 1:
Add 5,000 ppm chemical to test bottle.
Heat in oven at 300°F for 6 days until dry film.
Exposure: Fluid: Kerosene and 5% NaCl Brine
Oil/Water Ratio: 50/50
Acid Gas: $CO_2$
Temperature: 160°F
Time: 24 Hours

| Chemical | Weight Loss mg. | % Protection |
|---|---|---|
| Comp. A * | 2.3 | 97 |
| Comp. B ** | 45.8 | 49 |
| Blanks | 89.4 | — |

Test No. 2:
Add 50,000 ppm chemical to test bottle.
Heat in oven at 300°F for 7 days until dry film.
Adsorption: Fluid: Kerosene and 5% NaCl Brine
Oil/Water Ratio: 50/50
Acid Gas: $CO_2$
Temperature: 160°F
Time: 3 Hours

| Chemical | Weight Loss mg. | % Protection |
|---|---|---|
| Comp. A * | 0.4 | 99 |
| Comp. B ** | 80.9 | 0 |
| Blanks | 76.0 | — |

* Composition A is the composition according to Example 1.
** composition B is an alkylbenzene sulfonic acid salt of partial amides of organic polyamines and acyclic monocarboxylic acids and polycarboxylic acids containing 1–48 carbons and an acyclic chain which is either saturated or olefinically unsaturated. This composition is produced according to the techniques of 3,412,024 Stanford.

Results: The results above showed that Composition A is effective for corrosion inhibition even when the liquids are removed and it is utilized as a dry film and showed comparatively good results over a prior art composition B.

What is claimed is:

1. A corrosion inhibiting composition for gas and oil wells which comprises in weight percent about:

| | |
|---|---|
| Primary fatty mono-amine where the carbon chain is $C_9$–$C_{24}$ | 5–50 |
| Trimerized unsaturated fatty acid wherein each repeating unit contains between 12 and 24 carbon atoms | 5–50 |
| Alkaryl sulfonic acid where the alkyl portion has a carbon chain length of $C_5$–$C_{18}$ | 1–20 |
| Lower alkanol dispersant wherein the carbon chain length is $C_2$–$C_6$ and aromatic solvent wherein the weight ratio of alkanol/ aromatic solvent is about 1:10 to 10:1. | balance |

2. The corrosion inhibiting composition according to claim 1 wherein the composition comprises in weight percent about:

| | |
|---|---|
| Primary fatty mono-amine where the carbon chain is $C_9$–$C_{24}$ | 5–30 |
| Trimerized unsaturated fatty acid wherein each repeating unit contains between 12 and 24 carbon atoms | 5–30 |
| Alkaryl sulfonic acid where the alkyl portion has a carbon chain length of $C_5$–$C_{18}$ | 1–20 |
| Lower alkanol dispersant wherein the carbon chain length is $C_2$–$C_6$ and aromatic solvent wherein the weight ratio of alkanol/ aromatic solvent is about 1:10 to 10:1. | balance |

3. The corrosion inhibiting composition according to claim 1 wherein the composition comprises in weight percent about:

| | |
|---|---|
| Primary fatty mono-amine where the carbon chain is $C_9$–$C_{24}$ | 10–20 |
| Trimerized unsaturated fatty acid wherein each repeating unit contains between 12 and 24 carbon atoms | 10–20 |
| Alkaryl sulfonic acid where the alkyl portion has a carbon chain length of $C_5$–$C_{18}$ | 1–20 |
| Lower alkanol dispersant wherein the carbon chain length is $C_2$–$C_6$ and aromatic solvent wherein the weight ratio of alkanol/ aromatic solvent is about 1:10 to 10:1. | balance |

4. The corrosion inhibiting composition according to claim 1 wherein the composition comprises in weight percent about:

| | |
|---|---|
| Primary fatty mono-amine where the carbon chain is $C_9$–$C_{24}$ | 15 |
| Trimerized unsaturated fatty acid wherein each repeating unit contains between 12 and 24 carbon atoms | 15 |
| Dodecylbenzenesulfonic acid | 8 |
| Isobutanol | 8 |
| Aromatic solvent | 54. |

5. The corrosion inhibiting composition according to claim 1 wherein additionally is added a minor amount of a water-in-oil demulsifying agent.

6. A method of inhibiting corrosion in metal surfaces in gas and oil wells at temperatures above 250°F which comprises introducing into such wells an effective amount sufficient to inhibit corrosion of a composition of the following formulation in weight percent about:

| | |
|---|---|
| Primary fatty mono-amine where the carbon chain is $C_9$–$C_{24}$ | 5–50 |
| Trimerized unsaturated fatty acid wherein each repeating unit contains between 12 and 24 carbon atoms | 5–50 |
| Alkaryl sulfonic acid where the alkyl portion has a carbon chain length of $C_5$–$C_{18}$ | 1–20 |
| Lower alkanol dispersant wherein the carbon chain length is $C_2$–$C_6$ and aromatic solvent wherein the weight ratio of alkanol/ aromatic solvent is about 1:10 to 10:1. | balance |

7. The method of inhibiting corrosion in metal surfaces according to claim 6 wherein the composition comprises the following in weight percent about:

| | |
|---|---|
| Primary fatty mono-amine where the carbon chain is $C_9$–$C_{24}$ | 5–30 |
| Trimerized unsaturated fatty acid wherein each repeating unit contains between 12 and 24 carbon atoms | 5–30 |
| Alkaryl sulfonic acid where the alkyl portion has a carbon chain length of $C_5$–$C_{18}$ | 1–20 |
| Lower alkanol dispersant wherein the carbon chain length is $C_2$–$C_6$ and aromatic solvent wherein the weight ratio of alkanol/ solvent is about 1:10 to 10:1. | balance |

8. The method of inhibiting corrosion in metal surfaces according to claim 6 wherein the composition comprises the following in weight percent about:

| | |
|---|---|
| Primary fatty mono-amine where the carbon chain is $C_9$–$C_{24}$ | 10–20 |
| Trimerized unsaturated fatty acid wherein each repeating unit contains between 12 and 24 carbon atoms | 10–20 |
| Alkaryl sulfonic acid where the alkyl portion has a carbon chain length of $C_5$–$C_{18}$ | 1–20 |
| Lower alkanol dispersant wherein the carbon chain length is $C_2$–$C_6$ and aromatic solvent wherein the weight ratio of alkanol/ aromatic solvent is about 1:10 to 10:1. | balance |

9. The method of inhibiting corrosion in metal surfaces according to claim 6 wherein the composition comprises the following in weight percent about:

| | |
|---|---|
| Primary fatty mono-amine where the carbon chain is $C_9$–$C_{24}$ | 15 |
| Trimerized unsaturated fatty acid wherein each repeating unit contains between 12 and 24 carbon atoms | 15 |
| Dodecylbenzenesulfonic acid | 8 |
| Isobutanol | 8 |
| Aromatic solvent | 54. |

* * * * *

UNITED STATES PATENT AND TRADEMARK OFFICE
CERTIFICATE OF CORRECTION

PATENT NO. : 3,959,158
DATED : May 25, 1976
INVENTOR(S) : JAMES R. STANFORD and GEORGE D. CHAPPELL It is certified that error appears in the above-identified patent and that said Letters Patent are hereby corrected as shown below:

IN THE CLAIMS:

CLAIM 7, LINE 34 SHOULD READ:

"AROMATIC SOLVENT IS ABOUT 1:10 to"

Signed and Sealed this

Thirty-first Day of August 1976

[SEAL]

Attest:

RUTH C. MASON
Attesting Officer

C. MARSHALL DANN
Commissioner of Patents and Trademarks